US009918252B2

United States Patent
Cheng et al.

(10) Patent No.: US 9,918,252 B2
(45) Date of Patent: Mar. 13, 2018

(54) RATE ADAPTATION FOR LTE-WLAN AGGREGATION

(71) Applicant: MEDIATEK INC., Hsinchu (TW)

(72) Inventors: Ming-Yuan Cheng, Taipei (TW);
Yih-Shen Chen, Hsinchu County (TW);
Chie-Ming Chou, Taichung (TW);
Pavan Santhana Krishna Nuggehalli, Mountain View, CA (US); Chia-Chun Hsu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 110 days.

(21) Appl. No.: 15/152,771

(22) Filed: May 12, 2016

(65) Prior Publication Data
US 2016/0338068 A1 Nov. 17, 2016

Related U.S. Application Data

(60) Provisional application No. 62/162,282, filed on May 15, 2015.

(51) Int. Cl.
*H04W 36/28* (2009.01)
*H04W 28/22* (2009.01)
(Continued)

(52) U.S. Cl.
CPC ....... *H04W 28/22* (2013.01); *H04W 28/0236* (2013.01); *H04W 28/08* (2013.01); *H04L 47/14* (2013.01); *H04W 88/06* (2013.01)

(58) Field of Classification Search
CPC .. H04L 47/14; H04W 28/0236; H04W 28/08; H04W 28/22; H04W 88/06; H04W 72/00;
(Continued)

(56) References Cited

U.S. PATENT DOCUMENTS

| 2014/0029570 A1 | 1/2014 | Lee et al. ................ 370/331 |
| 2014/0092828 A1* | 4/2014 | Sirotkin ............ H04W 52/0258 370/329 |

(Continued)

FOREIGN PATENT DOCUMENTS

EP    2675241 A1    6/2012

OTHER PUBLICATIONS

International Search Report and Written Opinion of International Search Authority for PCT/CN2016/082033 dated Jul. 26, 2016 (11 pages).

*Primary Examiner* — Mohamed Kamara
(74) *Attorney, Agent, or Firm* — Imperium Patent Works; Zheng Jin

(57) ABSTRACT

LWA (LTE/WLAN Aggregation) is a tight integration at radio level which allows for real-time channel and load aware radio resource management across WLAN and LTE to provide significant user perceived throughput (UPT) improvement. When enabling LWA, packets are routed to a base station (eNB) for performing PDCP functionalities as an LTE PDU. Afterwards, the eNB can dispatch the PDU either delivered over LTE link or WLAN link. The UPT improvement depends on how the eNB dispatches the PDU over LTE link or WLAN link. In one novel aspect, the eNB can acquire channel information, load information, and throughput estimation regarding with WLAN link and LTE link. As a result, the eNB can optimize UPT and LWA PDU dispatching algorithm.

20 Claims, 5 Drawing Sheets

(51) Int. Cl.
*H04W 28/08* (2009.01)
*H04W 28/02* (2009.01)
*H04W 88/06* (2009.01)
*H04L 12/801* (2013.01)

(58) Field of Classification Search
CPC ..... H04W 72/04; H04W 74/00; H04W 74/04; H04W 36/00; H04W 36/28
See application file for complete search history.

(56) References Cited

U.S. PATENT DOCUMENTS

| | | | |
|---|---|---|---|
| 2014/0120969 A1* | 5/2014 | Sang | H04W 72/1215 455/501 |
| 2014/0293970 A1* | 10/2014 | Damnjanovic | H04L 5/0078 370/336 |
| 2014/0321376 A1* | 10/2014 | Damnjanovic | H04W 72/1215 370/329 |
| 2015/0092573 A1 | 4/2015 | Zhang et al. | 370/252 |
| 2015/0156774 A1 | 6/2015 | Urie | 370/329 |
| 2016/0338074 A1* | 11/2016 | Chou | H04W 76/046 |
| 2016/0338102 A1* | 11/2016 | Nuggehalli | H04L 12/4645 |

\* cited by examiner

LAYER-1 MEASUREMENT-BASED APPROACH

LAYER-1 MEASUREMENT-BASED WITH LOADING INFORMATION APPROACH

L2 THROUGHPUT MEASUREMENT-BASED APPROACH

| D/C | PDU TYPE | FMS | OCT 1 |
| --- | --- | --- | --- |
| | FMS (cont.) | | OCT 2 |
| | HRW | | OCT 3 |
| HRW (cont.) | | NMP | OCT 4 |
| | NMP (cont.) | | OCT 5 |

CONTROL PLANE PDCP PDU FOR LWA STATUS REPORT

RATE ADAPTATION FOR LTE-WLAN AGGREGATION

CROSS REFERENCE TO RELATED APPLICATIONS

This application claims priority under 35 U.S.C. § 119 from U.S. Provisional Application No. 62/162,282 entitled "Rate Adaptation for LTE-WLAN Aggregation" filed on May 15, 2015, the subject matter of which is incorporated herein by reference.

TECHNICAL FIELD

The disclosed embodiments relate generally to wireless communication, and, more particularly, to rate adaptation for LTE-WLAN aggregation.

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Interworking between the LTE network and the unlicensed spectrum WLAN provides additional bandwidth to the operators.

The current approaches of interworking of LTE and WLAN suffer from various limitations that hamper the benefits of LTE-WLAN interworking. For example, core network approaches like ANDSF provide rich support for implementing operator policy, providing subscriber specific service, and enabling different kinds of WLAN deployment (e.g., trusted and non-trusted WLANs). However, the core network approaches suffer from significant performance shortcomings. These approaches are unable to react to dynamically varying radio conditions and do not permit aggregation of IP flows over LTE and WLAN access. Some of these limitations have been addressed 3GPP on RAN assisted 3GPP/WLAN interworking (IWK). While the RAN assisted IWK feature promises to improve Quality of Experience (QoE) and network utilization, it is also limited by the inability to aggregate IP flows as well as support of limited traffic granularity at the PDN level.

A potential solution to more fully reap the benefits of LTE-WLAN interworking is to allow LTE-WLAN aggregation (LWA) by integrating the protocol stacks of LTE and WLAN systems. The LTE-WLAN aggregation (LWA) provides data aggregation at the radio access network where an eNB dispatches packets to be served on LTE and Wi-Fi radio link. The advantage is that LWA can provide better control and utilization of resources on both links. LWA can increase the aggregate throughput for all users and improve the total system capacity by better managing the radio resources among users. LWA borrows the concept of existing dual connectivity (DuCo) to let WLAN network being transport to Core Network (CN) for reducing CN load and support "packet level" offload. Under the architecture, eNB can dispatch packets either by LTE or WLAN dynamically to improve UE perceived throughput (UPT). Thus, the dispatcher is responsible to decide how many packets (or the traffic dispatching ratio) are delivered to LTE/WLAN appropriately. The eNB may perform such dispatching based on respective channel condition, loadings, or throughput information, where the different dispatching algorithm may influence UPT a lot.

Under DuCo deployment, with existing CP interface between SeNB, the MeNB is able to identify the shortest and longest packet latency (e.g. cover the backhaul latency, ARQ maximum transmission time, and scheduling latency) to configure the reordering timer value appropriately. Meanwhile, with X2-UP signaling (i.e., DL USER DATA, DL DATA DELIVERY STATUS), the MeNB and SeNB can exchange the successful PDU delivery information and buffer size information to allow the flow control of PDU over the X2 interface. Unfortunately, such CP/UP interface does not exist under LWA and eNB fails to understand the information and WLAN's PDCP PDU delivery status when PDU is delivering to WLAN link. A solution on how to optimize UPT and LWA PDCP PDU dispatching algorithm by means of eNB acquiring channel information, load information, and throughput estimation is sought.

SUMMARY

LWA (LTE/WLAN Aggregation) is a tight integration at radio level which allows for real-time channel and load aware radio resource management across WLAN and LTE to provide significant user perceived throughput (UPT) improvement. When enabling LWA, packets are routed to a base station (eNB) for performing PDCP functionalities as an LTE PDU. Afterwards, the eNB can dispatch the PDU either delivered over LTE link or WLAN link. The UPT improvement depends on how the eNB dispatches the PDU over LTE link or WLAN link. In one novel aspect, the eNB can acquire channel information, load information, and throughput estimation regarding with WLAN link and LTE link. As a result, the eNB can optimize UPT and LWA PDU dispatching algorithm.

In one embodiment, a base station configures LTE-WLAN aggregation (LWA) for a user equipment (UE) in a wireless network. The UE is connected with the base station over an LTE link and an LWA-enabled access point (AP) over a WLAN link. The base station transmits a radio resource control (RRC) signaling message to the UE. The RRC signaling message comprises measurement and reporting configuration. The base station receives a measurement report comprising WLAN link info and LTE link info from the UE and thereby estimating a throughput of the WLAN link and a throughput of the LTE link. The base station performs rate adaptation for dispatching data traffic based on the estimated throughputs.

In another embodiment, a user equipment (UE) receives an LTE-WLAN aggregation (LWA) configuration from a base station in a wireless network. The UE is connected with the base station over an LTE link and an LWA-enabled access point (AP) over a WLAN link. The UE receives a radio resource control (RRC) signaling message from the base station. The RRC signaling message comprises a measurement configuration and a reporting configuration. The UE performs measurements over the WLAN link and the LTE link based on the measurement configuration. The UE transmits a measurement report comprising WLAN link info and LTE link info based on the reporting configuration.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
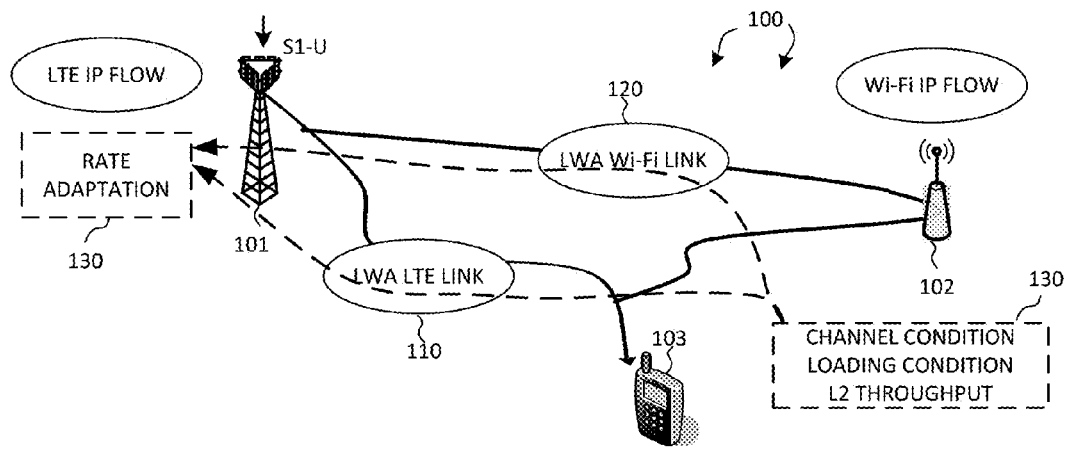
FIG. 1 illustrates a system diagram of a wireless network with LTE-WAN aggregation (LWA) in accordance with embodiments of the current invention.

FIG. 1 illustrates a system diagram of a wireless network 100 with LTE-WLAN aggregation (LWA) in accordance with embodiments of the current invention. Wireless network 100 comprises a base station eNB 101 that provides LTE cellular radio access via E-UTRAN, an access point AP 102 that provides Wi-Fi radio access via WLAN, and a user equipment UE 103. LTE-WLAN Aggregation (LWA) is a tight integration at radio level, which allows for real-time channel and load-aware radio resource management across LTE and WLAN to provide significant capacity and Quality of Experience (QoE) improvements. When enabling LWA, S1-U interface is terminated at eNB 101 whereby all IP packets are routed to eNB 101 and performed with PDCP layer operations as an LTE PDU. Afterwards, eNB 101 can dispatch whether LWA-LTE link 110 or LWA-Wi-Fi link 120 the LTE PDU shall go. LWA borrows the concept of existing dual connectivity (DuCo) to let WLAN network being transport to the core network (CN) for reducing CN load and support "Packet level" offload.

In the example of FIG. 1, IP packets are carried between a serving gateway and eNB 101 over the S1-U interface. The LWA capable eNB 101 performs legacy PDCP layer operations such as ciphering and header compression (ROHC). In addition, the LWA capable eNB 101 is responsible for aggregating data flows over the LTE and WLAN air-interfaces. For example, the PDCP entity of the LWA capable eNB 101 performs traffic splitting, flow control, and new PDCP header handling for LWA packets received from the serving gateway. In the downlink, eNB 101 can dispatch a few PDCP PDUs over LTE access and the remaining over WLAN access. The PDCP entity of the LWA capable UE 103 buffers the PDCP PDUs received over LTE and WLAN air interfaces and performs appropriate functions such as traffic converging and reordering, new PDCP header handling, and legacy PDCP operation. Similar functionality is also required for the uplink.

When eNB 101 dispatches the packet to LTE link 110, based on configured SN length, corresponding PDCP header is added as a formal user data structure and then the PDCP PDU is sending to RLC entity. Alternatively, when the eNB 101 dispatches the packet to WLAN link 120 to facilitate transmission over Wi-Fi radio, the PDCP entity will encapsulate the packet as an IEEE 802 frame format and consequently ferry the frame to WLAN AP 102 through user plane interface. Under the architecture, the eNB can dispatch packets either by LTE or WLAN dynamically to improve UE perceived throughput (UPT). Thus, the dispatcher is responsible to decide how many packets (or the traffic dispatching ratio) are translated to LTE/WLAN appropriately. The eNB may perform such dispatching based on respective channel conditions, loadings, or throughput information, wherein the different dispatching algorithms may influence UPT a lot.

Theoretically, the maximum throughput is achieved when the radio of LTE and WLAN data portion equals to the ratio of LTE and WLAN throughput (or buffer/queue consuming speed). For example, if ThroughputLTE=30 Mbps, and ThroughputWLAN=70 Mbps, then the idea partition of data is Data-LTE:Data-WLAN=3:7. If the total buffered data is 100M, LTE handles 30M and WLAN handles the other 70M. This would result in LTE and WLAN finish transmitting at the same time, therefore, no extra delay. Thus, throughput estimation becomes a critical part in optimizing LWA performance. There are several factors to influence UPT under LWA. The first factor is channel condition—it is the signal strength between eNB and UE, WiFi AP and UE. The better signal strength, the better channel quality between eNB and UE, WiFi AP and UE. Better channel quality means higher throughput can be achieved. The second factor is loading condition—it can be the number of active users on the eNB and WiFi AP. More users, less throughput each user can perceive. It is so called congestion level of the WiFi AP and eNB. Buffer queue status can represent loading condition as well. The fullness of buffer queue status can represent the lower throughput.

In accordance with a novel aspect, the eNB can acquire channel information, load information, and throughput estimation for rate adaptation between WLAN and LTE link, as depicted by box 130. As a result, the eNB can optimize UPT and LWA PDU dispatching algorithm. There are several approaches to estimate user throughput information. Layer-1 L1 measurement-based approach, L1 measurement-based with loading information approach, and Layer-2 (L2) throughput measurement-based approach are discussed below with additional details.

Figure 2:
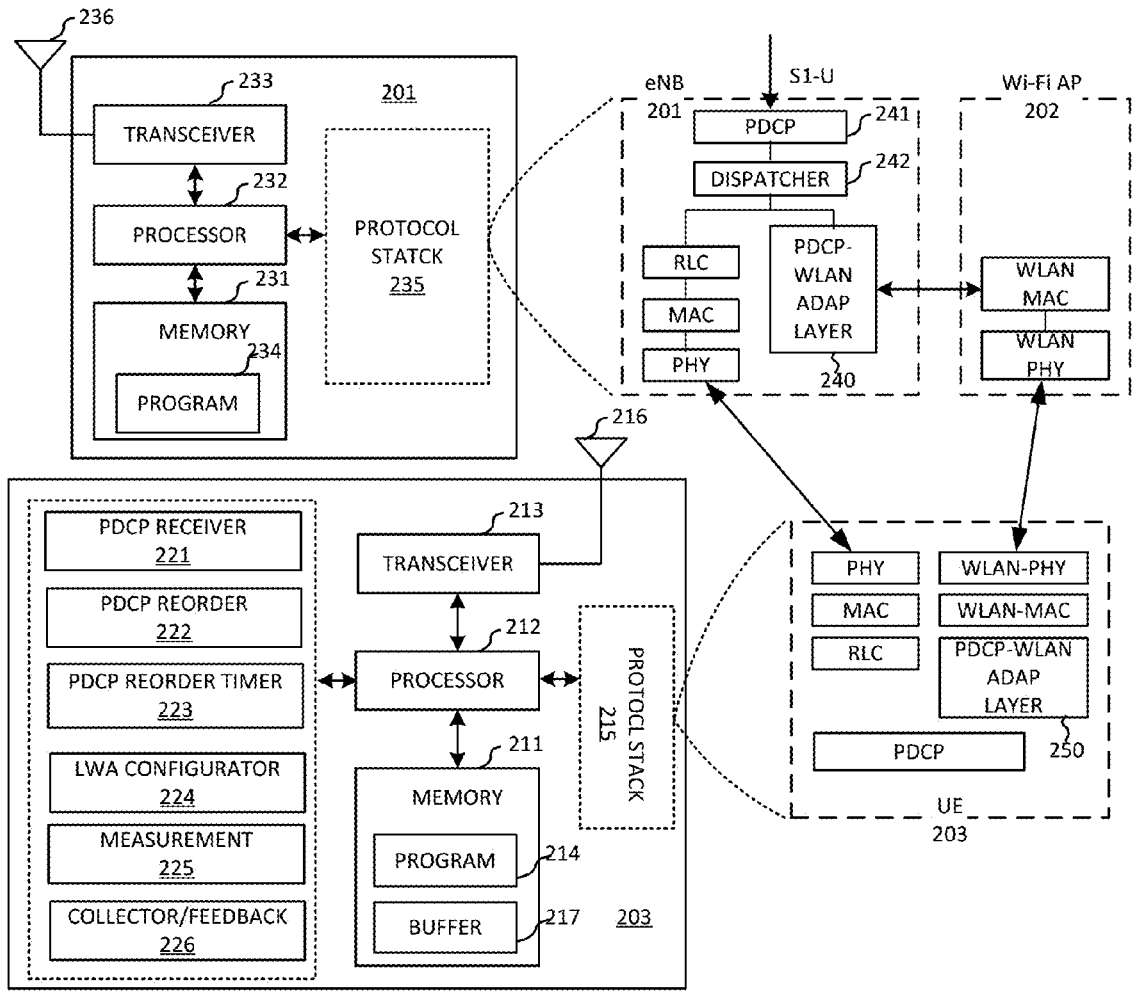
FIG. 2 illustrates simplified block diagram of LWA enabled network entities in accordance with embodiments of the current invention.

FIG. 2 illustrates simplified block diagrams for eNB 201, Wi-Fi AP 202, and UE 203. UE 203 has radio frequency (RF) transceiver module 213, coupled with antenna 216, receives RF signals from antenna 216, converts them to baseband signals and sends them to processor 212. RF transceiver 213 also converts received baseband signals from the processor 212, converts them to RF signals, and sends out to antenna 216. Processor 212 processes the received baseband signals and invokes different functional modules to perform features in UE 203. Memory 211 stores program instructions 214 and buffer 217 and other data to control the operations of UE 203.

UE 203 also includes multiple function modules and circuits that carry out different tasks in accordance with embodiments of the current invention. UE 203 includes a PDCP receiver 221, a PDCP reordering handler 222, a PDCP reordering timer 223, an LWA configuration module 224, a measurement module 225, and a collector/feedback module 226. PDCP receiver 221 receives one or more PDCP protocol data units (PDUs) from lower layers. PDCP reordering module 222 performs a timer-based PDCP reordering process upon detecting a PDCP gap condition. PDCP reordering timer 223 starts a reordering timer when detecting the PDCP gap existing condition and detecting no reordering timer running. LWA configurator 224 configures LWA configuration received from the network for LWA and for measurement/reporting configuration. Measurement module 225 performs L1 and L2 measurements. Collector/Feedback module 226 reports measurement results and collected PDCP status to the serving base station.

Similarly, FIG. 2 shows an exemplary block diagram for eNB 201. eNB 201 has RF transceiver module 233, coupled with antenna 236, receives RF signals from antenna 236, converts them to baseband signals and sends them to processor 232. RF transceiver 233 also converts received baseband signals from the processor 232, converts them to RF signals, and sends out to antenna 236. Processor 232 processes the received baseband signals and invokes different functional modules to perform features in eNB 201. Memory 231 stores program instructions and data 234 to control the operations of eNB 201. A protocol stack 235 performs enhanced protocol stack task in accordance to embodiments of the current invention. In one example, the PDCP layer entity 241 performs traffic splitting, flow control, and new PDCP header handling for LWA packets. The dispatcher 242 of eNB 201 dispatches a few PDCP PDUs over LTE access and the remaining over WLAN access. The eNB acquires channel information, load information, and throughput estimation regarding with WLAN link and LTE link to make the dispatching decision for rate adaptation to maximize/optimize UPT.

FIG. 2 also shows that UE 203 is LWA-enabled and connects with an eNB 201 and a WLAN AP 202 with data aggregation at radio link level in accordance with embodiments of the current invention. UE 203 is connected with eNB 201. UE 203 also selects WLAN AP 202 for data aggregation. In protocol stack 235, eNB 201 has a PHY layer, a MAC layer, a RLC layer, a scheduler, and a PDCP layer. To enable the LWA, eNB 201 also has a PDCP-WLAN adapter 240 that aggregates the LTE data traffic through PHY with WLAN data traffic through WLAN AP 202. WLAN AP 202 has a WLAN PHY layer and a WLAN MAC layer. WLAN AP 202 connects with the WLAN network and can offload data traffic from the LTE network when UE 203 is connected with both the eNB 201 and the AP 202.

UE 203 is LWA-enabled. UE 203 has a PHY layer, a MAC layer, and a RLC layer that connect with the LTE eNB 201. UE 203 also has a WLAN PHY layer and a WLAN MAC layer that connect with WLAN AP 202. A WLAN-PDCP adaptation layer 250 handles the split bearer from the LTE and the WLAN. UE 203 also has a PDCP layer entity. UE 203 aggregation its data traffic with eNB 201 and AP 202. WLAN PHY of WLAN AP 202 connects with WLAN PHY of UE 203 through a WLAN interface. PHY layer of LTE eNB 201 connects with PHY layer of UE 203 through a uu interface. For LWA, both the LTE data traffic and the WLAN data traffic are aggregated at the PDCP layer of UE 203. The PDCP-WLAN adaptation layer 240 at the eNB and the WLAN-PDCP adaptation layer 250 at the UE are proposed to facilitate transmission of LTE PDCP PDUs using WLAN frames in the downlink. Similar adaptation layers are proposed for uplink transmission of PDCP PDUs using WLAN frames.

Figure 3:
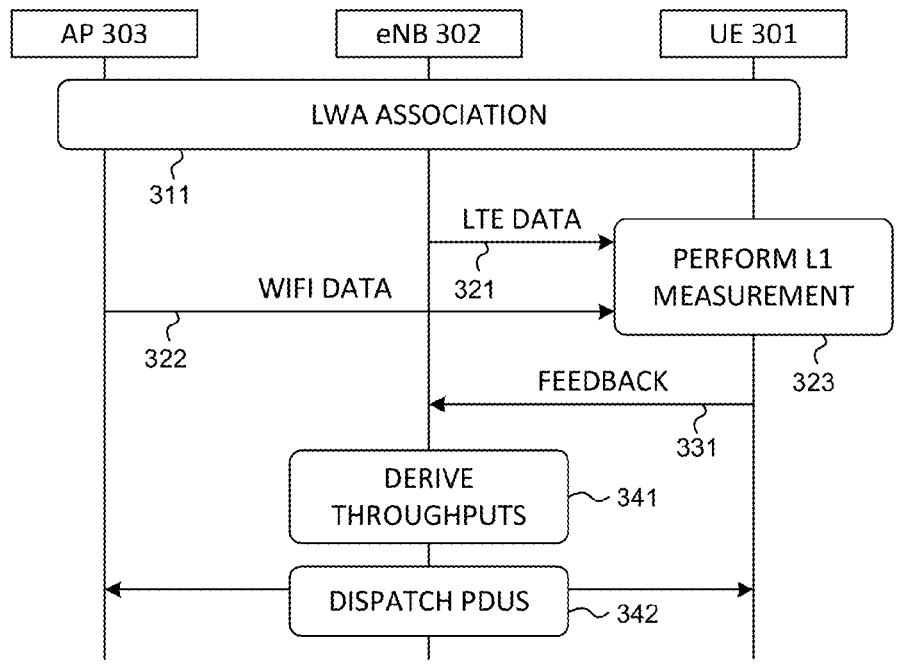
FIG. 3 illustrates one embodiment of layer-1 measurement-based approach of estimating user throughput and rate adaptation for LWA.

FIG. 3 illustrates one embodiment of layer-1 measurement-based approach of estimating user throughput and rate adaptation for LWA. In a wireless network, UE 301, LTE base station eNB 302, and Wi-Fi access point AP 303 perform LWA association in step 311. Specifically, eNB 302 provides LWA configuration with cooperating WLANs to UE 301. UE 301 establishes one or more data radio bearer (DRBs) with eNB 302 for data transmission over the cellular interface. In addition, UE 301 also connects to AP 303 for WLAN access. In step 321, UE 301 receives data traffic over LTE link, and in step 322, UE 301 receives data traffic over WLAN link. In step 323, UE 301 performs L1 measurements. In step 331, UE 301 reports feedback to eNB 302. Based on the L1 measurement information, eNB 302 derives ThroughputWLAN and ThroughputLTE in step 341. Finally, in step 342, eNB 302 dispatches X % traffic to LTE link and (100−X) % traffic to WLAN link. Typically, X=100*ThroughputLTE/(ThroughputWLAN+ThroughputLTE) to maximize system throughput and UPT.

This method dispatches traffic to LTE and WLAN according to L1 measurements, e.g., modulation and coding scheme (MCS) based on measured received signal strength indicator (RSSI) value for WLAN and channel quality indicator (CQI) index for LTE. Specifically, UE 301 measures signal strength over common reference signal (CRS) and report CQI index to eNB 302 via Uu interface. UE 301 also measures over beacon signal and report WiFi RSSI, signal to noise ratio (SNR), and MCS to eNB 302 via Uu interface. WiFi AP 303 may also report to eNB 302 via eNB-AP interface.

Figure 4:
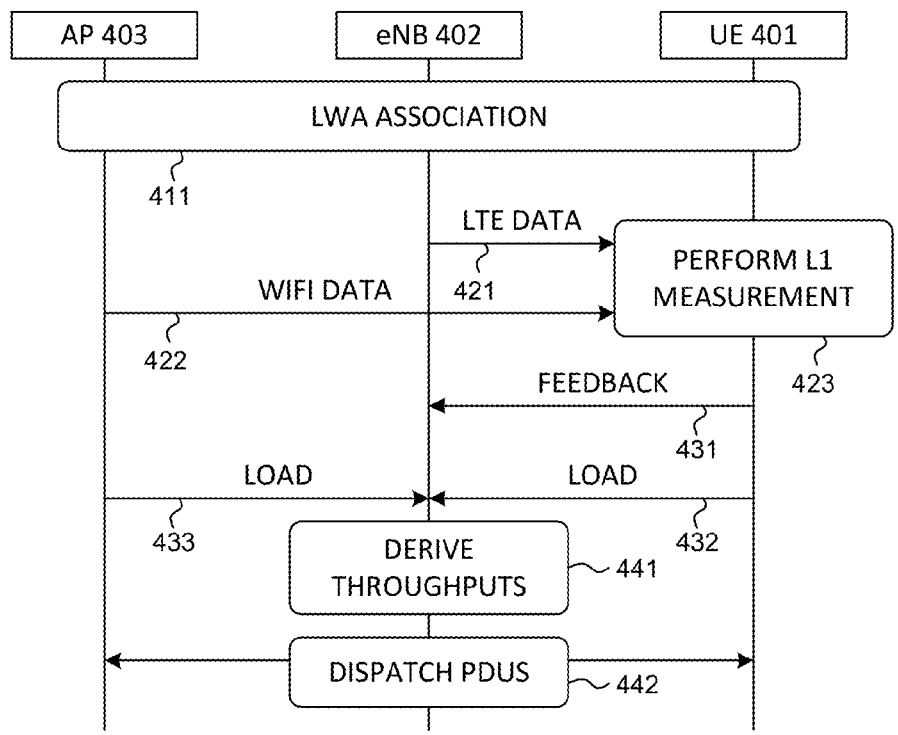
FIG. 4 illustrates one embodiment of layer-1 measurement-based with load information approach of estimating user throughput and rate adaptation for LWA.

FIG. 4 illustrates one embodiment of layer-1 measurement-based with loading information approach of estimating user throughput and rate adaptation for LWA. In a wireless network, UE 401, LTE base station eNB 402, and Wi-Fi access point AP 403 perform LWA association in step 411. Specifically, eNB 402 provides LWA configuration with cooperating WLANs to UE 401. UE 401 establishes one or more data radio bearer (DRBs) with eNB 402 for data transmission over the cellular interface. In addition, UE 401 also connects to AP 403 for WLAN access. In step 421, UE 401 receives data over LTE link, and in step 422, UE 401 receives data over WLAN link. In step 423, UE 401 performs L1 measurements. In step 431, UE 401 reports feedback to eNB 402. In step 432, eNB 402 receives load information from UE 401 or from AP 403 (step 433). Based on the L1 measurement feedback and the loading information, eNB 402 derives ThroughputWLAN and ThroughputLTE in step 441. Finally, in step 442, eNB 402 dispatches X % traffic to LTE link and (100−X) % traffic to WLAN link. Typically, X=100*ThroughputLTE/(ThroughputWLAN+ThroughputLTE) to maximize system throughput and UPT.

This method dispatches traffic to LTE and WLAN according to L1 measurements with loading status, e.g., MCS based on measured RSSI value for WLAN and CQI index for LTE. Specifically, UE 401 measures signal strength over CRS and report CQI index to eNB 402 via Uu interface. UE 401 also measures over beacon signal for WiFi RSSI, SNR and feedback MCS to eNB 402 via Uu interface. The load information for LTE comprises the number of attached UEs, resource utilization (RU), eNB buffer status, and access delay. LTE load information can be obtained internally by eNB 402 itself. The load information for WiFi comprises the number of attached STAs, channel utilization, WiFi AP buffer status, and access delay. UE 401 can obtain WiFi load information from beacon then feedback to eNB 402 via Uu interface. AP 403 can also feedback WiFi load information via eNB-AP interface.

Figure 5:
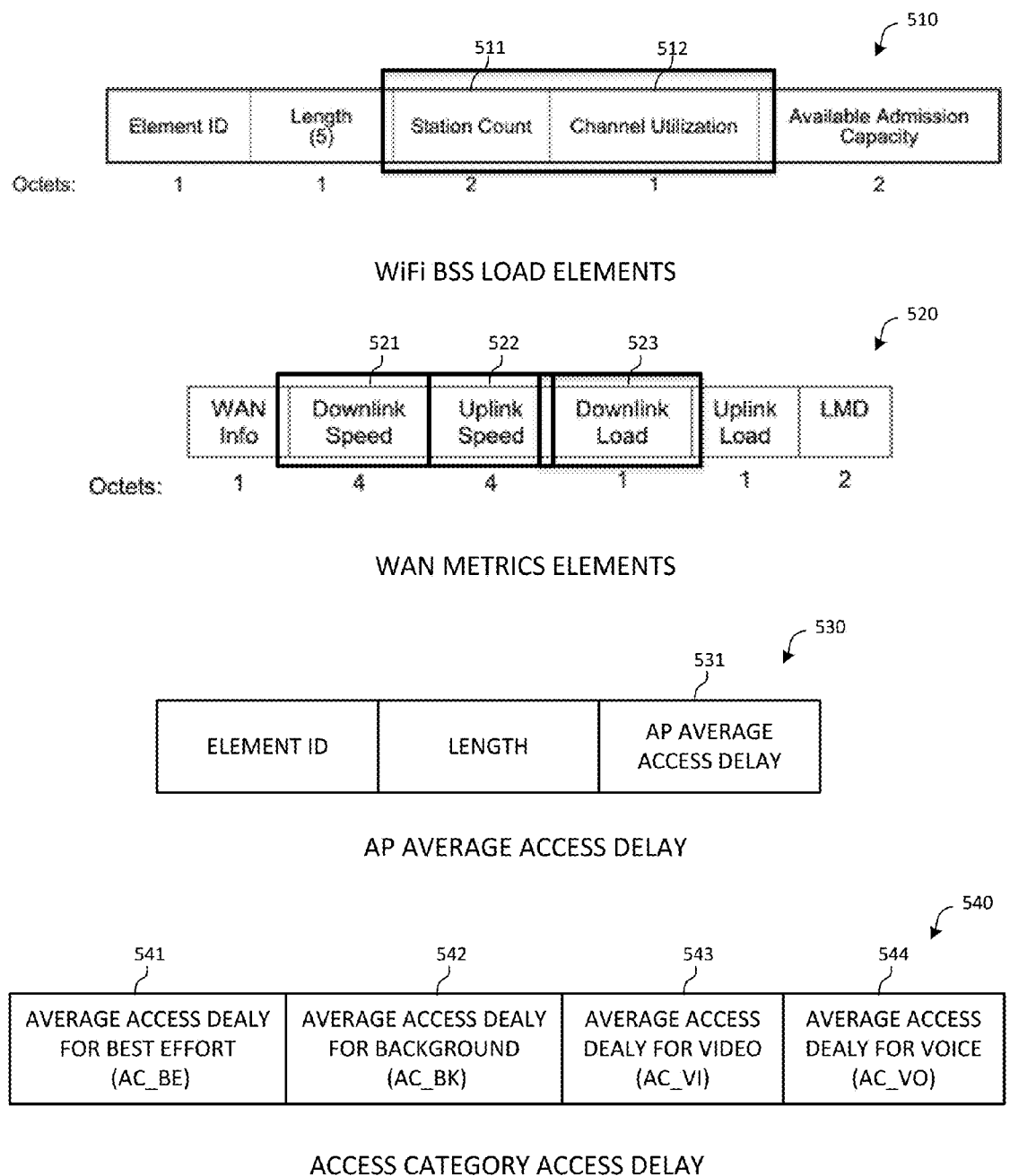
FIG. 5 illustrates examples of load information of WiFi network to be feedback to eNB for making traffic dispatching decisions for LWA.

FIG. 5 illustrates examples of load information of WiFi network to be feedback to eNB for traffic dispatching and rate adaptation decisions for LWA. WiFi BSS (basic service set) load elements is depicted by 510, which comprises a station count field 511 and a channel utilization field 512. WAN metrics elements is depicted by 520, which comprises a downlink speed field 521, an uplink speed field 522, and a downlink load field 523. AP average access delay is depicted by 530, which comprises the average access delay field 531. Access Category (AC) access delay is depicted by 540, which comprises the average access delay for each individual access category fields 541 (for AC_BE), 542 (for AC_BK), 543 (for AC_VI) and 544 (for AC_VO).

Figures 6, 7:
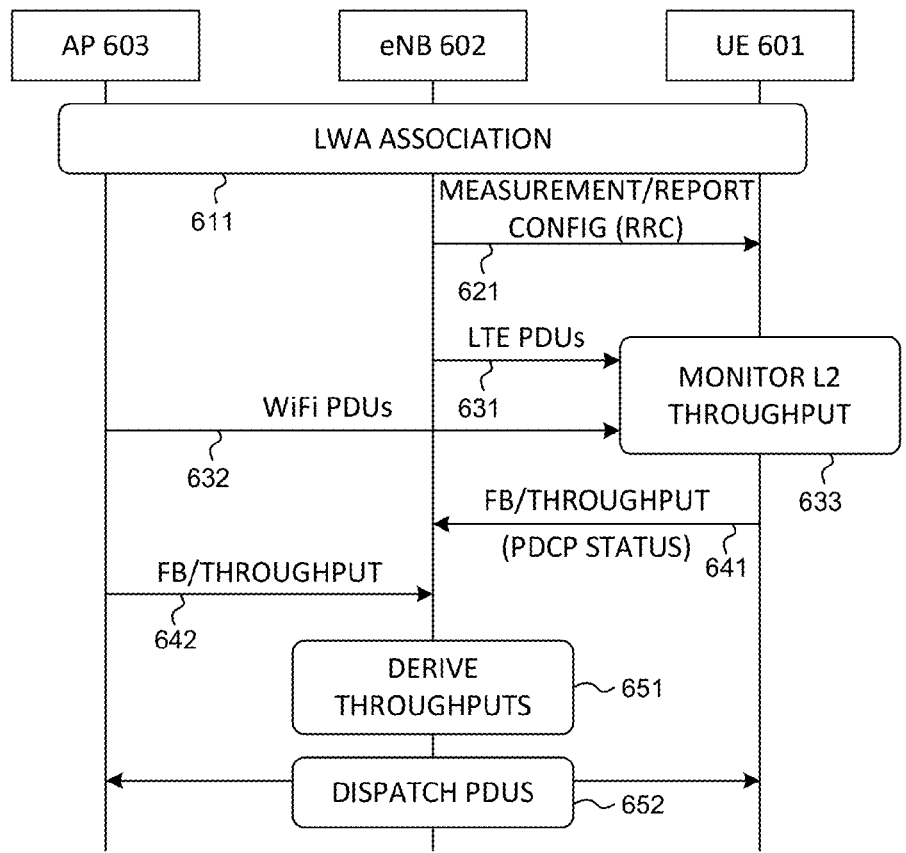
FIG. 6 illustrates one embodiment of layer-2 throughput measurement-based approach of estimating user throughput and rate adaptation for LWA.
FIG. 7 illustrates one example of a control plane PDCP PDU carrying LWA status report.

FIG. 6 illustrates one embodiment of layer-2 throughput measurement-based approach of estimating user throughput and rate adaptation for LWA. In a wireless network, UE 601, LTE base station eNB 602, and Wi-Fi access point AP 603 perform LWA association in step 611. Specifically, eNB 602 provides LWA configuration with cooperating WLANs to UE 601. UE 601 establishes one or more data radio bearer (DRBs) with eNB 602 for data transmission over the cellular interface. In addition, UE 601 also connects to AP 603 for WLAN access. In step 621, UE 601 receives measurement/report configuration from eNB 602 for L2 measurements and reporting. In step 631, UE 601 receives PDCP PDUs over LTE link, and in step 632, UE 601 receives PDCP PDUs over WLAN link. In step 633, UE 601 performs L2 measurements. In step 641, UE 601 reports feedback to eNB 602. In step 642, AP 603 reports feedback to eNB 602. Based on the L2 throughput feedback, eNB 602 derives ThroughputWLAN and ThroughputLTE in step 651. Finally, in step 652, eNB 602 dispatches X % traffic to LTE link and (100−X) % traffic to WLAN link. Typically, X=100*ThroughputLTE/(ThroughputWLAN+ThroughputLTE) to maximize system throughput and UPT.

This method dispatches traffic to LTE and WLAN according to L2 throughput measurements, i.e., successful received data bits during active transmission time (exclude idle time). The feedback comprises L2_ThroughputLTE monitored and reported by UE, L2_ThroughputWLAN monitored by UE (based on the accumulated transmitted data volume), L2_ThroughputWLAN reported by AP, and L2_ThroughputLTE monitored by eNB (based on its own queue buffer size or sequence number of each UE). For example, eNB can accumulates data volume based on the packet sequence number (e.g., PDCP SN). Since eNB knows the sequence number and packet size of each PDCP packet, it can derive the L2 throughput by the SN info report. Based on the L2 throughputs, eNB can derive the actual throughput with a filter coefficient α, i.e., ThroughputWLAN($n$)=(1−α)*ThroughputWLAN($n$−1)+α*L2_ThroughputWLAN ThroughputLTE($n$)=(1−α)*ThroughputLTE($n$−1)+α*L2_ThroughputLTE In addition to real throughput measurement, UE can also report PDCP packet count related information to estimate the WLAN throughput, e.g., step 641 in FIG. 6. One alternative is to report PDCP packet count from UE PDCP layer to eNB. Another alternative is to use current PDCP status report but request UE to report on a periodic basis. The current PDCP status report includes the SN of first missing PDCP SDU (FMS) and a bitmap for the status of following SDUs. With periodic PDCP status report, the eNB can estimate the L2 throughput of the split bearer first and then deduct the LTE part to get estimated WLAN throughput. The measurement and reporting configuration in step 621 is via radio resource control (RRC) signaling. For status polling, the eNB can indicate the PDCP control PDU option when it is triggered by E-UTRAN polling. Either legacy PDCP control PDU for PDCP status reporting or LWA-specific PDCP control PDU for LWA status reporting can be configured. Similarly, periodic status reporting can also be configured for LWA status reporting.

FIG. 7 illustrates one example of a control plane PDCP PDU 700 carrying LWA status report when a 12-bit SN length is used. UE-based LWA PDCP status report can help eNB to perform flow control and rate adaptation between LTE and WLAN. The eNB can either poll the UE using LWA-specific PDCP control PDUs for LWA PDCP status reporting, or configure the UE for periodic LWA PDCP status reporting. When LWA status is triggered, the UE shall compile an LWA status report and submit to lower layers as the first PDCP PDU for the transmission, by: setting the FMS field to the PDCP SN of the first missing PDCP SDU; setting the HRW field to the PDCP SN of the PDCP SDU received on WLAN with highest PDCP COUNT value or to FMS if no PDCP SDUs have been received on WLAN; setting the NMP field to the number of missing PDCP SNs.

Figure 8:
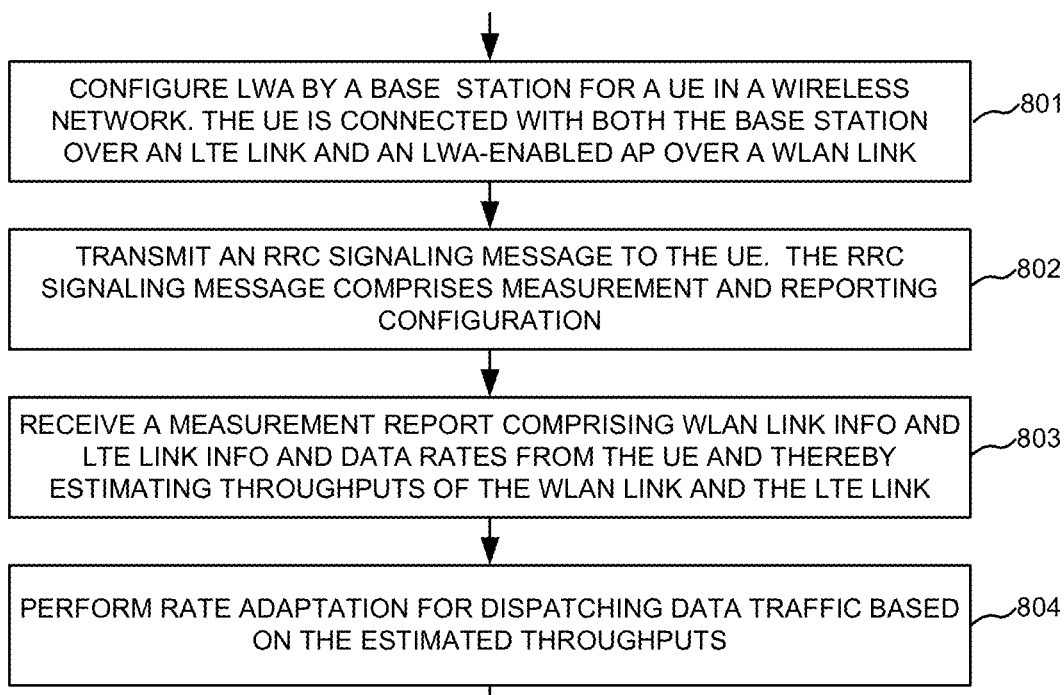
FIG. 8 is a flow chart of a method of user throughput estimation from eNB perspective for LWA rate adaptation in accordance with one novel aspect.

FIG. 8 is a flow chart of a method of user throughput estimation from eNB perspective for LWA rate adaptation in accordance with one novel aspect. In step 801, a base station configures LTE-WLAN aggregation (LWA) for a user equipment (UE) in a wireless network. The UE is connected with the base station over an LTE link and an LWA-enabled access point (AP) over a WLAN link. In step 802, the base station transmits a radio resource control (RRC) signaling message to the UE. The RRC signaling message comprises measurement and reporting configuration. In step 803, the base station receives a measurement report comprising WLAN link info and LTE link info and sustainable data rates from the UE and thereby estimating a throughput of the WLAN link and a throughput of the LTE link. In step 804, the base station performs rate adaptation for dispatching data traffic based on the estimated throughputs.

Figure 9:
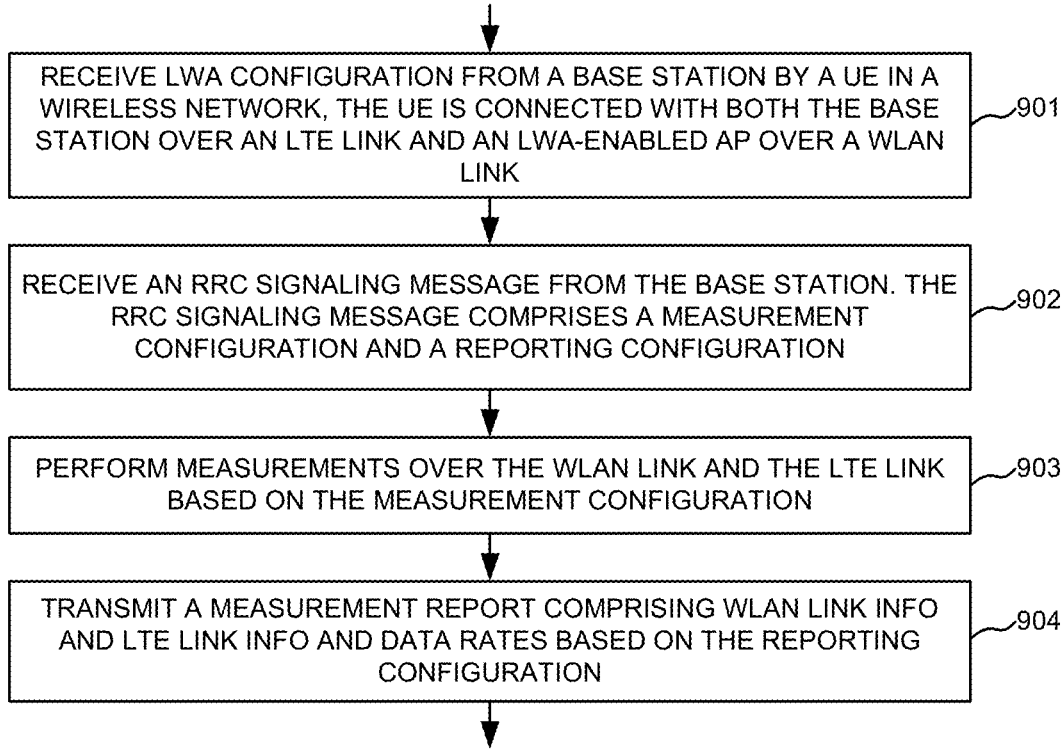
FIG. 9 is a flow chart of a method of user throughput estimation from UE perspective for LWA rate adaptation in accordance with one novel aspect.

FIG. 9 is a flow chart of a method of user throughput estimation from UE perspective for LWA rate adaptation in accordance with one novel aspect. In step 901, a UE receives an LTE-WLAN aggregation (LWA) configuration from a base station in a wireless network. The UE is connected with the base station over an LTE link and an LWA-enabled access point (AP) over a WLAN link. In step 902, the UE receives a radio resource control (RRC) signaling message from the base station. The RRC signaling message comprises a measurement configuration and a reporting configuration. In step 903, the UE performs measurements over the WLAN link and the LTE link based on the measurement configuration. In step 904, the UE transmits a measurement report comprising WLAN link info and LTE link info and sustainable data rates based on the reporting configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
configuring LTE-WLAN aggregation (LWA) by a base station for a user equipment (UE) in a wireless network, wherein the UE is connected with the base station over an LTE link and an LWA-enabled access point (AP) over a WLAN link;
transmitting a radio resource control (RRC) signaling message to the UE, wherein the RRC signaling message comprises measurement and reporting configuration;
receiving a measurement report comprising WLAN link info and LTE link info and data rates from the UE and thereby estimating a throughput of the WLAN link and a throughput of the LTE link; and
performing rate adaptation for dispatching data traffic based on the estimated throughputs.

2. The method of claim 1, wherein the WLAN link info comprises a WLAN receives signal strength indicator (RSSI), a WLAN signal to noise ratio (SNR), and a WLAN modulation and coding scheme (MCS).

3. The method of claim 1, wherein the WLAN link info comprises a WLAN station count, a WLAN channel utilization, and a WLAN basic service set (BSS) load.

4. The method of claim 1, wherein the WLAN link info and the LTE link info each comprises an observed L2 throughput, a number of successful received data bits, and an active transmission time.

5. The method of claim 1, wherein the LTE link info comprises an LTE channel quality indicator (CQI) index.

6. The method of claim 1, wherein the WLAN link info and the LTE link info each comprises packet data convergence protocol (PDCP) layer LWA status report.

7. The method of claim 6, wherein the base station configures LWA-specific PDCP control PDUs for the LWA status report.

8. The method of claim 6, wherein the base station configures periodic measurement and reporting for the LWA status report.

9. A method comprising:
receiving an LTE-WLAN aggregation (LWA) configuration from a base station by a user equipment (UE) in a wireless network, wherein the UE is connected with the base station over an LTE link and an LWA-enabled access point (AP) over a WLAN link;
receiving a radio resource control (RRC) signaling message from the base station, wherein the RRC signaling message comprises a measurement configuration and a reporting configuration;
performing measurements over the WLAN link and the LTE link based on the measurement configuration; and
transmitting a measurement report comprising WLAN link info and LTE link info and data rates based on the reporting configuration.

10. The method of claim 9, wherein the WLAN link info comprises a WLAN receives signal strength indicator (RSSI), a WLAN signal to noise ratio (SNR), and a WLAN modulation and coding scheme (MCS).

11. The method of claim 9, wherein the LTE link info comprises an LTE channel quality indicator (CQI) index.

12. The method of claim 9, wherein the WLAN link info comprises a WLAN station count, a WLAN channel utilization, and a WLAN basic service set (BSS) load.

13. The method of claim 9, wherein the WLAN link info and the LTE link info each comprises an observed L2 throughput, a number of successful received data bits, and an active transmission time.

14. The method of claim 9, wherein the UE is configured for packet data convergence protocol (PDCP) layer LWA status report comprising PDCP packet count information over the WLAN link.

15. A user equipment (UE) comprising:
an LTE-WLAN aggregation (LWA) configurator that configures LWA based on LWA configuration received from a base station in a wireless network, wherein the UE is connected with the base station over an LTE link and an LWA-enabled access point (AP) over a WLAN link;
a receiver that receives a radio resource control (RRC) signaling message from the base station, wherein the RRC signaling message comprises a measurement configuration and a reporting configuration;
a measurement circuit that performs measurements over the WLAN link and the LTE link based on the measurement configuration; and
a transmitter that transmits a measurement report comprising WLAN link info and LTE link info and data rates based on the reporting configuration.

16. The UE of claim 15, wherein the WLAN link info comprises a WLAN receives signal strength indicator (RSSI), a WLAN signal to noise ratio (SNR), and a WLAN modulation and coding scheme (MCS).

17. The UE of claim 15, wherein the LTE link info comprises an LTE channel quality indicator (CQI) index.

18. The UE of claim 15, wherein the WLAN link info comprises a WLAN station count, a WLAN channel utilization, and a WLAN basic service set (BSS) load.

19. The UE of claim 15, wherein the WLAN link info and the LTE link info each comprises an observed L2 throughput, a number of successful received data bits, and an active transmission time.

20. The UE of claim 15, wherein the UE is configured for packet data convergence protocol (PDCP) layer LWA status report comprising PDCP packet count information over the WLAN link.

* * * * *